(12) United States Patent
Liu et al.

(10) Patent No.: US 11,488,741 B2
(45) Date of Patent: Nov. 1, 2022

(54) GEL IMPREGNATED BUSHING

(71) Applicant: Hitachi Energy Switzerland AG, Baden (CH)

(72) Inventors: Rongsheng Liu, Västerås (SE);
Gerhard Brosig, Västerås (SE);
Santanu Singha, Västerås (SE);
Sung-Woo Cho, Upplands Väsby (SE);
Johan Nyberg, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/977,591

(22) PCT Filed: Mar. 14, 2019

(86) PCT No.: PCT/EP2019/056443
§ 371 (c)(1),
(2) Date: Sep. 2, 2020

(87) PCT Pub. No.: WO2019/179879
PCT Pub. Date: Sep. 26, 2019

(65) Prior Publication Data
US 2020/0411208 A1    Dec. 31, 2020

(30) Foreign Application Priority Data
Mar. 19, 2018 (EP) .................... 18162533

(51) Int. Cl.
*H01B 3/22* (2006.01)
*C08L 91/00* (2006.01)
(Continued)

(52) U.S. Cl.
CPC ............... *H01B 3/22* (2013.01); *C08L 91/00* (2013.01); *H01B 3/441* (2013.01); *H01B 17/28* (2013.01);
(Continued)

(58) Field of Classification Search
CPC .......... B01B 3/22; B01B 17/18; B01B 19/02; C08L 91/00; C08L 2203/202
See application file for complete search history.

(56) References Cited

U.S. PATENT DOCUMENTS 3,585,278 A    6/1971  Quirk
3,980,803 A *  9/1976  Yasufuku .............. H01B 3/465
                                                174/17 LF
(Continued)

FOREIGN PATENT DOCUMENTS

CN    1285077 A    2/2001
CN    1496383 A    5/2004
(Continued)

OTHER PUBLICATIONS

International Search Report and Written Opinion dated May 21, 2019 for International Application No. PCT/EP2019/056443, 12 pages.
(Continued)

*Primary Examiner* — Tae H Yoon
(74) *Attorney, Agent, or Firm* — Sage Patent Group

(57) ABSTRACT

The present disclosure relates to a high-voltage (HV) bushing comprising a condenser core configured for surrounding a HV electrical conductor. The condenser core comprises an insulation material comprising wound layers of a permeable solid material impregnated with a thermo-reversible gel. The gel comprises an oil and a thickener, the oil comprising iso-paraffinic oil in an amount within the range of 0.1-100 wt % of the oil and the thickener comprising at least one copolymer in an amount within the range of 0.1-10 wt % of the gel.

16 Claims, 3 Drawing Sheets

(51) Int. Cl.
*H01B 3/44* (2006.01)
*H01B 19/02* (2006.01)
*H01B 17/28* (2006.01)

(52) U.S. Cl.
CPC .......... *H01B 19/02* (2013.01); *C08L 2201/56* (2013.01); *C08L 2203/202* (2013.01); *C08L 2207/32* (2013.01)

(56) References Cited

U.S. PATENT DOCUMENTS

| | | | |
|---|---|---|---|
| 4,798,853 A * | 1/1989 | Handlin, Jr. | C08L 53/025 523/173 |
| 6,391,447 B1 | 5/2002 | Kornfeldt et al. | |
| 6,933,341 B2 | 8/2005 | Truong Dinh et al. | |
| 8,134,089 B2 | 3/2012 | Roseen et al. | |
| 9,304,231 B2 * | 4/2016 | Salazar | C10M 169/00 |
| 9,552,907 B2 * | 1/2017 | Emilsson | H01B 17/28 |
| 10,125,255 B2 * | 11/2018 | Cai | C08L 3/00 |
| 10,340,075 B2 * | 7/2019 | Zhang | H01F 27/12 |
| 2015/0364229 A1 * | 12/2015 | Singha | H01B 3/22 174/30 |

FOREIGN PATENT DOCUMENTS

| | | | |
|---|---|---|---|
| CN | 102827482 A | | 12/2012 |
| CN | 107799245 A | | 3/2018 |
| EP | 1622173 A1 | | 2/2006 |
| SE | 1651576 A1 | | 12/2016 |
| WO | 97/04466 A1 | | 2/1997 |
| WO | WO 99/33066 | * | 7/1999 |
| WO | 2014161596 A1 | | 10/2014 |

OTHER PUBLICATIONS

International Preliminary Report on Patentability dated Oct. 1, 2020 for International Application No. PCT/EP2019/056443, 8 pages.
Extended European Search Report dated Sep. 13, 2018 for European Patent Application No. 18162533.6, 5 pages.
Chinese First Office Action dated Mar. 8, 2021 for Chinese Patent Application No. 20198002015806, 8 pages (including English translation).

* cited by examiner

GEL IMPREGNATED BUSHING

CROSS-REFERENCE TO RELATED APPLICATIONS

This application is a 35 U.S.C. § 371 national stage application of PCT International Application No. PCT/EP2019/056443 filed on Mar. 14, 2019, which in turn claims foreign priority to European Patent Application No. 18162533.6 filed on Mar. 19, 2018, the disclosures and content of which are incorporated by reference herein in their entirety.

TECHNICAL FIELD

The present disclosure relates to an electrical insulation system comprising a thermo-reversible gel.

BACKGROUND

The use of electrically insulating thermo-reversible gels are known for impregnating power cable insulation.

WO 97/04466 relates to a High-Voltage Direct Current (HVDC) power cable comprising an insulation of a plurality of permeable tapes wound around the conductor. An impregnating compound fills all voids among the tape layers. The impregnating compound has a very steep slope of change of viscosity characteristics, the viscosity being high with a solid gel type structure at temperatures equal to and below the maximum operating temperature of the cable and being low with a thin liquid type structure at higher temperatures at which impregnation takes place. Preferably, 95% of the impregnating compound consists of alkane chains with chain lengths above 15 carbon units but no more than 2% of the chains have chain lengths above 28 carbon units.

WO 99/33066 discloses a dielectric gelling composition, exhibiting a thermo-reversible liquid-gel transition at a transition temperature, wherein the gel comprises an oil and a gelator with a block copolymer. The gelling composition is used as an impregnant in an insulated direct current (DC) cable having at least one conductor and an impregnated insulation system. The insulation system comprises a solid electrically insulating dielectric part with a porous, fibrous and/or laminated structure impregnated with the dielectric gelling composition.

U.S. Pat. No. 6,391,447 relates to a method for manufacture of an electric device having at least one conductor and a porous, fibrous and/or laminated electrically insulating dielectric system comprising a solid electrically insulating part impregnated with a dielectric fluid, wherein the method comprises impregnating with a dielectric fluid, wherein a gelling additive is added to impart a high viscosity and elasticity to the fluid at conditions for which the device is designed to operate under.

However, for a power cable it is important that the gel is soft and fluid enough to be bendable during ambient and operation temperatures in order not to crack or otherwise introduce voids or deformations in the insulation which would be detrimental to the insulating ability of the insulation material.

SUMMARY

It has been realised that insulating gels of the prior art are too fluid for use in high-voltage (HV) bushings for the following reasons, each by itself or in combination:

- The HV bushing may not be positioned vertically, but rather more or less horizontally, which implies that the gel will leak from the bushing at one (top) of its ends if not sealed liquid tight.
- The gel may have a relatively low viscosity at the high operating temperature of the HV bushing.

It is thus an objective of the present invention to provide an electrically insulating thermo-reversible gel with increased viscosity for HV bushings.

According to an aspect of the present invention, there is provided a HV bushing comprising a condenser core configured for surrounding a HV electrical conductor. The condenser core comprises an insulation material comprising wound layers of a permeable solid material impregnated with a thermo-reversible gel. The gel comprises an oil and a thickener. The oil comprises iso-paraffinic oil in an amount within the range of 0.1-100 wt %, preferably 50-100 wt %, of the oil. The thickener comprises at least one copolymer in an amount within the range of 0.1-10 wt % of the gel.

According to another aspect of the present invention, there is provided a method of preparing a condenser core for a HV bushing. The method comprises winding a web of a permeable solid material around a longitudinal passage for a HV electrical conductor. Before, after or concurrently, the method also comprises mixing an oil with a thickener to form a thermo-reversible gel. The method also comprises heating the gel to at least a first temperature at which the gel has a viscosity below 1 Pa·s. The method also comprises impregnating the wound permeable solid material with the gel at said first temperature to form an insulation material comprising wound layers of the permeable solid material impregnated with the thermo-reversible gel. The method also comprises cooling the insulation material to a second temperature at which the gel has a viscosity above 1 Pa·s to form the condenser core. The oil comprises iso-paraffinic oil in an amount within the range of 0.1-100 wt %, preferably 50-100 wt %, of the oil and the thickener comprises at least one copolymer in an amount within the range of 0.1-10 wt % of the gel.

By using a high amount of iso-paraffinic oil in the gel, a gel with a higher transition temperature (also called knee temperature herein) can be obtained, compared with if only regular mineral oil is used. The transition temperature being a temperature within a temperature range in which the thermo-reversible gel transitions between its high viscosity (herein also called solid) and low viscosity (herein also called liquid) forms. The gel may change viscosity more or less continuously with changing temperature, but does so relatively much more steeply within the transition temperature range. A further higher transition temperature may be obtained by selecting a suitable thickener, e.g. a copolymer with a higher molecular weight, or by using a higher amount of thickener. If a somewhat lower transition temperature is desired, an amount of mineral oil may be mixed with the iso-paraffinic oil to form the oil in the gel. Thus, the inventors have managed to obtain a gel insulation system which is suitable for HV bushings in accordance with the present invention.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
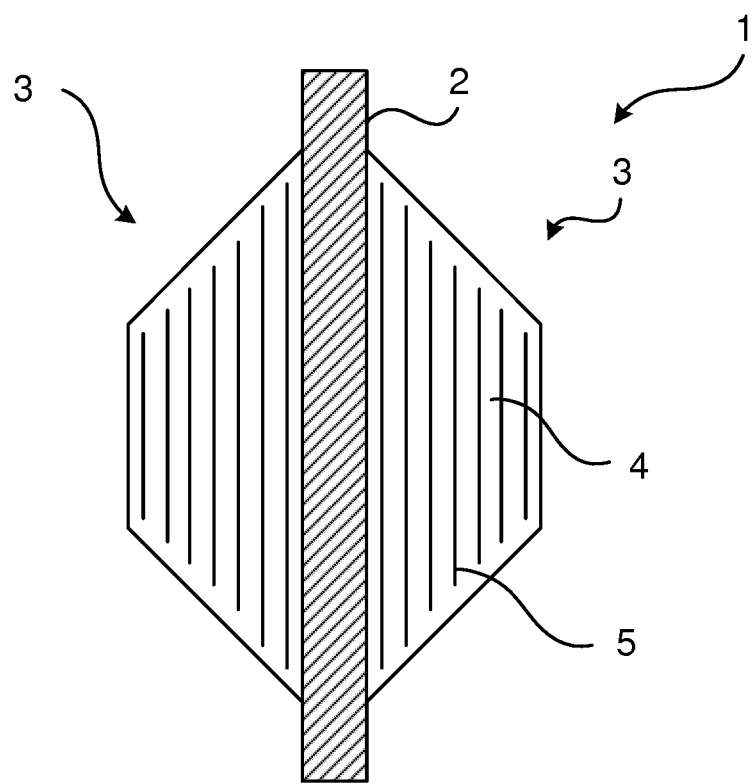
FIG. 1 is a schematic illustration of an embodiment of a HV bushing in longitudinal section, in accordance with the present invention.

FIG. 1 illustrates an embodiment of a HV bushing 1 comprising an insulation in the form of a condenser core 3 surrounding a passage for a HV conductor 2. The bushing 1 may e.g. be for allowing the conductor 2 to pass through a wall, e.g. of a power transformer, converter or other electrical equipment. The condenser core 3 comprises an insulating material 4 of wound layers of a permeable solid material impregnated with a thermo-reversible gel. The permeable solid material may e.g. be cellulose based such as a paper material, e.g. craft or crêpe paper, or aramid papers such as NOMEX™ paper, or a combination thereof, which can be impregnated by the gel in liquid form. The gel is a mixture of an oil with a thickener, and optional additives such as an anti-oxidant. Typically, the gel comprises at most 5 wt %, e.g. at most 1 wt %, of additives in addition to the oil and thickener which thus makes up at least 95 wt %, e.g. 99 wt %, of the gel. Optionally, the condenser core comprises a plurality of electrically conducting foils 5, floating in the insulation material 4, interleaved between layers of the wound layers, for modifying the electrical field formed by the conductor 2 in the bushing when in use, e.g. of aluminium (Al) or copper (Cu).

The oil comprises iso-paraffinic oil in an amount within the range of 0.1-100 wt %, preferably 50-100 wt %, of the oil. Iso-paraffinic oil (e.g. the commercially available Shell Diala S4 ZX-I) differs from conventional mineral oils, where iso-paraffinic oil consists primarily of iso-paraffinic molecules (distillates (Fischer-Tropsch), heavy, $C_{18-50}$ branched, cyclic and linear iso-paraffinic molecules of 95-100% concentration), while a mineral oil (e.g. the commercially available Nynas Nytro to XN) in contrast consists of paraffinic (such as 43%), naphthenic (such as 51%) and aromatic (such as 6%) parts. An iso-paraffinic oil, and thus the iso-paraffinic oil based gel of the present invention, has following benefits due to its special molecular structure:

Improved additive response causing improved oxidation resistance.

High flash point (e.g. at least 196° C.) as measured using the EN ISO 2592:2000 method.

No or low sulphur content.

Solid state of the gel with higher viscosity than gel used for cable insulation.

Higher (solid-to-liquid) transition temperature (such as >105° C.), and thus a higher operating temperature for the bushing 1 is made possible.

In some embodiments of the present invention, the oil comprises a mineral oil in an amount of 0.1-99 wt %, e.g. 10-50 wt %, of the oil, blended with the iso-paraffinic oil.

In some embodiments of the present invention, the oil comprises the iso-paraffinic oil in an amount of 60-80 wt % of the oil.

The thickener comprises at least one copolymer in an amount within the range of 0.1-10 wt % of the gel.

In order to increase the viscosity of the gel in its solid and/or liquid form, and/or in order to increase the transition temperature of the gel, a relatively high amount of thickener may be used. Thus, in some embodiments of the invention, the at least one copolymer in the thickener is present in an amount of at least 1 wt % of the gel, e.g. at least 2 wt % or at least 5 wt % of the gel.

Additionally or alternatively, in order to increase the viscosity of the gel in its solid and/or liquid form, and/or in order to increase the transition temperature of the gel, a copolymer with a relatively high molecular weight may be used. Thus, in some embodiments of the present invention, the at least one copolymer in the thickener has an average molecular weight of at least 200 kg/mol, or 300 kg/mol, 400 kg/mol or 500 kg/mol, e.g. about 600 kg/mol.

It has been determined that styrenic copolymers may be advantageously used in some embodiments of the present invention. Thus, in some embodiments of the present invention, the thickener comprises at least one styrenic copolymer, e.g. a block copolymer such as a tri- or di-block copolymer. Some copolymers which may be used in the thickener are given as examples in Table 1.

TABLE 1

| Proposed thickeners | | | |
|---|---|---|---|
| Preferred Thickeners | | Alternatives | |
| Composition | Commercial Name | Composition | Commercial Name |
| A tri-block copolymer consisting of polystyrene-b-poly(ethylene-ethylene/propylene)-b-polystyrene | Septon: SEEPS 4099 | A tri-block consisting of polystyrene-b-poly(ethylene-ethylene/propylene)-b-polystyrene | Septon: SEEPS 4077, SEEPS 4055, SEEPS 4044, SEEPS 4033 |
| | | polystyrene-b-poly(ethylene/butylene)-b-polystyrene | Septon: SEBS 8006 |
| | | polystyrene-b-poly(ethylene/propylene)-b-polystyrene | Septon: SEPS 2006 |

TABLE 1-continued

Proposed thickeners

| Preferred Thickeners | | Alternatives | |
|---|---|---|---|
| Composition | Commercial Name | Composition | Commercial Name |
| | | S-EB/S-S polymer | Kraton: A 1535 |
| | | SEBS polymer | Kraton: G1651 |
| | | ERS polymer | Kraton: G1641 |
| A di-block copolymer consisting of polystyrene-b-poly(ethylene/propylene) | Septon: SEP 1020 | A di-block consisting of polystyrene-b-poly(ethylene/propylene) | Septon: SEP 1001 |
| | | SEP polymer | Kraton: G1701 |

In some embodiments of the present invention, the thickener comprises a tri-block copolymer in an amount of at least 0.1 wt % of the gel, e.g. at least 1 wt % or at least 2 wt % of the gel. In some embodiments, the tri-block copolymer is polystyrene-b-poly(ethylene-ethylene/propylene)-b-polystyrene (commercially available as SEPTON™ SEEPS 4099).

Additionally or alternatively, in some embodiments of the present invention, the thickener comprises a di-block copolymer in an amount of at least 0.1 wt % of the gel, e.g. at least 1 wt % or at least 2 wt % of the gel. In some embodiments, the di-block copolymer is polystyrene-b-poly(ethylene/propylene), commercially available as SEPTON™ SEP 1020.

The thermo-reversible gel may preferably have a viscosity of at least 1 Pa·s, e.g. at least 5, at least 10 or at least 100 Pa·s in its solid form (at a in temperature below the transition temperature), in order to prevent leakage from the bushing 1.

Additionally or alternatively, the thermo-reversible gel may preferably have a viscosity of at most 1 Pa·s, e.g. at most 0.1 or at most 0.01 Pa·s in its liquid form (at a temperature above the transition temperature), in order to easily impregnate the permeable solid material.

The thermo-reversible gel may preferably have a transition temperature of at least 80° C., such as at least 105° C. For instance, the gel may have a viscosity above 1 Pa·s at 105° C.

Figure 2:
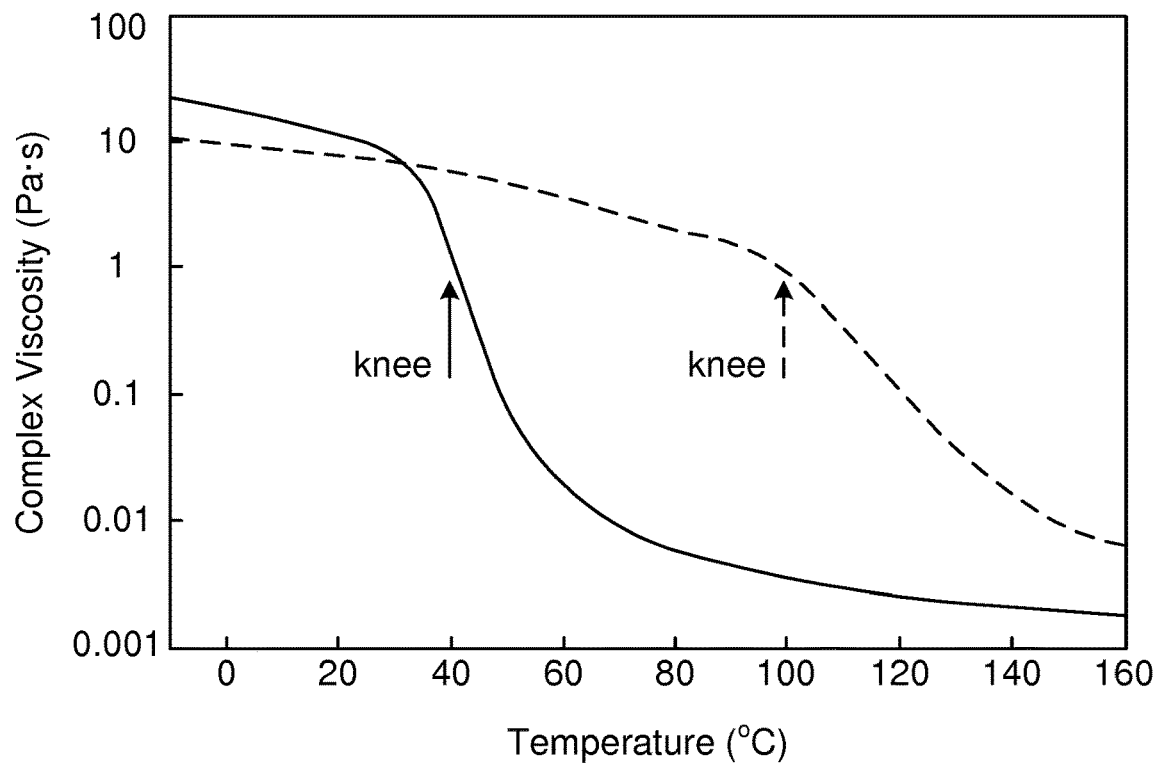
FIG. 2 is a schematic graph showing the complex viscosity at different temperatures for a mineral oil based gel and an iso-paraffinic oil based gel, respectively, with a first thickener.
Figure 3:
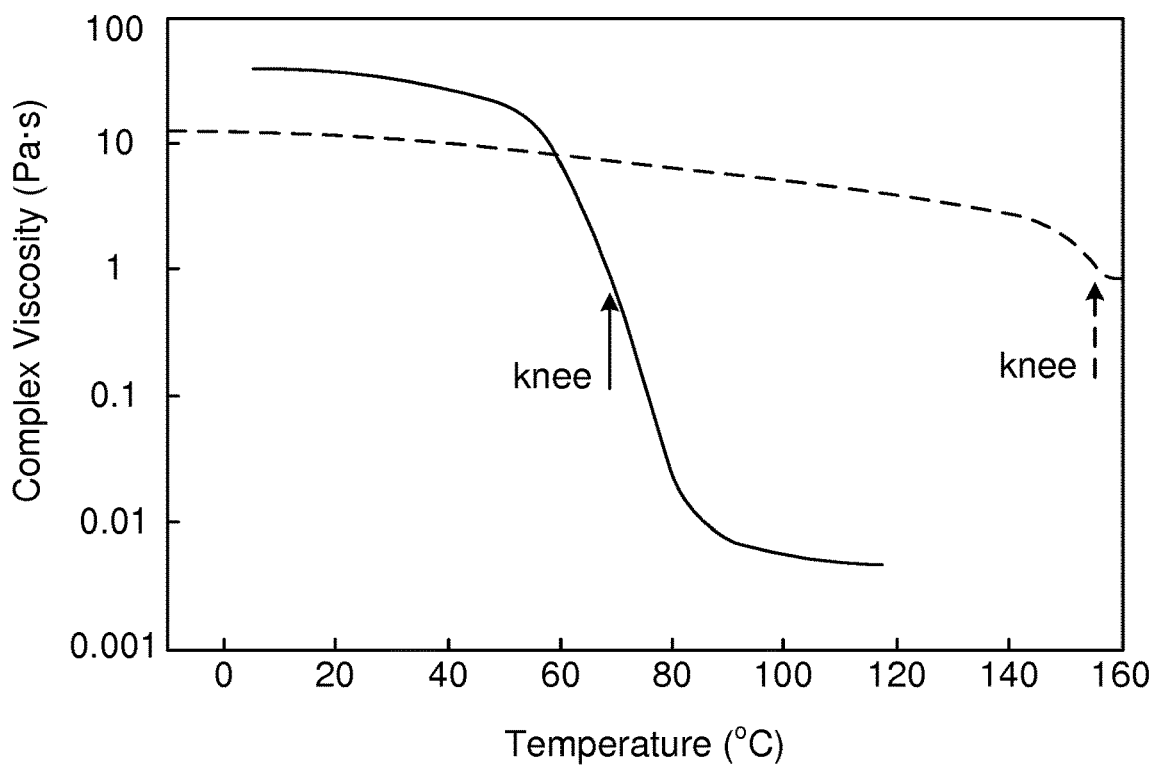
FIG. 3 is a schematic graph showing the complex viscosity at different temperatures for a mineral oil based gel and an iso-paraffinic oil based gel, respectively, with a second thickener.

FIGS. 2 and 3 illustrate the increased transition temperature ("knee" in the figure) when using iso-paraffinic oil (Shell Diala S4 ZX-I, dashed line) compared with mineral oil (Nynäs Nytro 10XN, solid line).

Referring to FIG. 2, for both oils, the thickener comprises a mixture of Kraton™ SEBS G1651 and SEP G1701, 0.4 wt % of SEBS G1651 and 0.8 wt % of SEP G1701 in the mineral oil gel, and 0.55 wt % of SEBS G1651 and 1.1 wt % of SEP G1701 in the iso-paraffin oil gel. As can be seen, the transition temperature increases from about 40° C. with the mineral oil to about 100° C. with the iso-paraffin oil.

Referring to FIG. 3, for both oils, the thickener comprises a mixture of SEPTON™ SEEPS 4099, 0.4 wt %, and SEP 1020, 0.8 wt %. As can be seen, the transition temperature increases from about 70° C. with the mineral oil to about 155° C. with the iso-paraffin oil.

When comparing the graphs of FIGS. 2 and 3, there can also be seen that the transition temperature increases when the SEPTON™ copolymers are used compared with the Kraton™ copolymers, from 40° C. to 70° C. with the mineral oil and from 100° C. to 155° C. with the iso-paraffin oil.

To obtain a gel with a high transition temperature, use of iso-paraffin oil is thus preferred. However, in order to be able to impregnate the wound permeable solid material, the gel needs to be liquid at the impregnation temperature. The impregnation temperature is substantially higher than the operating temperature of the bushing since the gel should be solid that said operating temperature, but it may be impractical with a very high impregnation temperature due to cost of heating and risk of damaging e.g. the permeable solid material. Thus, mineral oil may be mixed with the iso-paraffin oil to obtain a suitable transition temperature with any given thickener.

Figure 4:
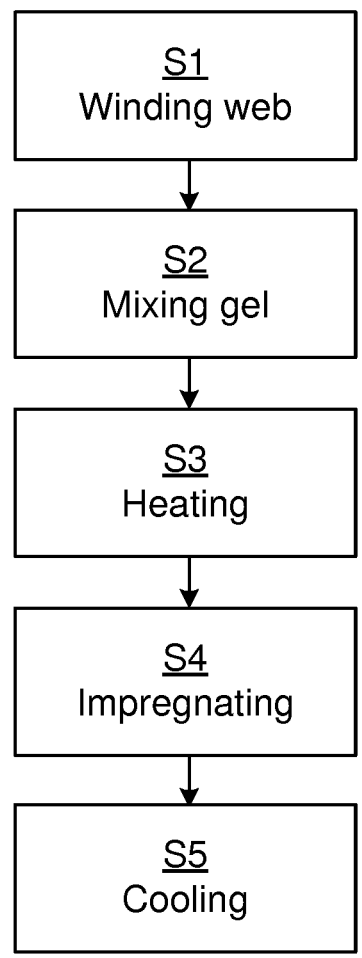
FIG. 4 is a schematic flow chart of an embodiment of a method of the present invention.

FIG. 4 is a schematic flow chart of an embodiment of a method for preparing a condenser core 3 for a HV bushing 1. The method comprises winding S1 a web of a permeable solid material around a longitudinal passage for a HV electrical conductor 2. The method also comprises mixing S2 an oil with a thickener to form a thermo-reversible gel. The method also comprises heating S3 the gel to at least a first temperature at which the gel has a viscosity below 1 Pa·s. The method also comprises impregnating S4 the wound permeable solid material with the gel at said first temperature to form an insulation material 4 comprising wound layers of the permeable solid material impregnated with the thermo-reversible gel. The method also comprises cooling S5 the insulation material 4 to a second temperature at which the gel has a viscosity above 1 Pa·s to form the condenser core 3. The oil comprises iso-paraffinic oil in an amount within the range of 0.1-100 wt %, preferably 50-100 wt %, of the oil and the thickener comprises at least one copolymer in an amount within the range of 0.1-10 wt % of the gel.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A high-voltage (HV) bushing comprising:
   a condenser core configured for surrounding a HV electrical conductor, the condenser core comprising an insulation material comprising wound layers of a permeable solid material impregnated with a thermo-reversible gel, the thermo-reversible gel comprising an oil and a thickener, the oil comprising iso-paraffinic oil in an amount within the range of 0.1-100 wt % of the oil, and the thickener comprising at least one styrenic copolymer in an amount within the range of 0.1-10 wt % of the thermo-reversible gel, the at least one styrenic copolymer comprising polystyrene-b-poly(ethylene-ethylene/propylene)-b-polystyrene, polystyrene-b-poly(ethylene/butylene)-b-polystyrene and polystyrene-b-poly(ethylene/propylene),
   a liquid form of the thermo-reversible gel having a viscosity below 1 Pa·s, and
   a solid form of the thermo-reversible gel having a viscosity of at least 1 Pa·s at 105° C.

2. The bushing of claim 1, wherein the oil comprises iso-paraffinic oil in an amount within the range of 50-100 wt % of the oil.

3. The bushing of claim 1, wherein the at least one styrenic copolymer is present in an amount of at least 1 wt % of the thermo-reversible gel.

4. The bushing of claim 1, wherein the at least one styrenic copolymer has an average molecular weight of at least 200 kg/mole.

5. The bushing of claim 1, wherein the polystyrene-b-poly(ethylene-ethylene/propylene)-b-polystyrene and polystyrene-b-poly(ethylene/butylene)-b-polystyrene are in an amount of at least 0.1 wt % of the thermo-reversible gel.

6. The bushing of claim 1, wherein the polystyrene-b-poly(ethylene/propylene) in an amount of at least 0.1 wt % of the gel.

7. The bushing of claim 1, wherein the oil comprises a mineral oil in an amount of a range of 10-50 wt % of the oil, blended with the iso-paraffinic oil.

8. The bushing of claim 1, wherein the oil comprises the iso-paraffinic oil in an amount of a range of 60-80 wt % of the oil.

9. The bushing of claim 1, wherein the permeable solid material comprises a cellulose-based material, an aramid paper, or a combination thereof.

10. A method of preparing a condenser core for a high-voltage (HV) bushing, the method comprising:
    winding a web of a permeable solid material around a longitudinal passage for a HV electrical conductor;
    mixing an oil with a thickener to form a thermo-reversible gel;
    heating the thermo-reversible gel to a first temperature at which the thermo-reversible gel has a viscosity associated with a liquid form of the thermo-reversible gel below 1 Pa·s;
    impregnating the wound permeable solid material with the thermo-reversible gel at said first temperature to form an insulation material comprising wound layers of the permeable solid material impregnated with the thermo-reversible gel; and
    cooling the insulation material to a second temperature that is lower than 105° C. at which the thermo-reversible gel has a viscosity associated with a solid form of the thermo-reversible gel of at least 1 Pa·s to form the condenser core,
    the oil comprising iso-paraffinic oil in an amount within the range of 0.1-100 wt % of the oil and the thickener comprising at least one styrenic copolymer in an amount within the range of 0.1-10 wt % of the thermo-reversible gel, the styrenic copolymer comprising:
        a tri-block copolymer comprising at least one of polystyrene-b-poly(ethylene-ethylene/propylene)-b-polystyrene and polystyrene-b-poly(ethylene/butylene)-b-polystyrene; and a di-block copolymer comprising polystyrene-b-poly(ethylene/propylene).

11. The method according to claim 10, wherein heating the thermo-reversible gel to the first temperature comprises heating the thermo-reversible gel to at least a first temperature at which the thermo-reversible gel has a viscosity at or below 0.1 Pa·s.

12. The method according to claim 10, wherein cooling the insulation material to the second temperature comprises cooling the insulation material to the second temperature at which the thermo-reversible gel has a viscosity at or above 5 Pa·s.

13. The method according to claim 10, wherein the first temperature is a temperature above a transition temperature of the thermo-reversible gel, wherein the second temperature is a temperature below the transition temperature, wherein the transition temperature is within a temperature range of 80° C. to 105° C.

14. The method according to claim 10, wherein heating the gel to the first temperature comprises heating the thermo-reversible gel to at least a first temperature at which the thermo-reversible gel has a viscosity at or below 0.01 Pa·s.

15. The method according to claim 10, wherein cooling the insulation material to the second temperature comprises cooling the insulation material to the second temperature at which the thermo-reversible gel has a viscosity of at least 100 Pa·s.

16. A high-voltage (HV) bushing comprising:
    a condenser core configured for surrounding a HV electrical conductor, the condenser core comprising an insulation material comprising wound layers of a permeable solid material impregnated with a thermo-reversible gel, the thermo-reversible gel comprising an oil and a thickener, the oil comprising iso-paraffinic oil in an amount within the range of 0.1-100 wt % of the oil, and the thickener comprising at least one styrenic copolymer in an amount within the range of 0.1-10 wt % of the thermo-reversible gel, the at least one styrenic copolymer comprising polystyrene-b-poly(ethylene/butylene)-b-polystyrene and polystyrene-b-poly(ethylene/propylene),
    a liquid form of the thermo-reversible gel having a viscosity below 1 Pa·s, and
    a solid form of the thermo-reversible gel having a viscosity of at least 1 Pa·s at 105° C.

* * * * *